April 10, 1934. H. O. HEM 1,954,205
WEIGHING SCALE
Filed Oct. 17, 1929 2 Sheets-Sheet 1
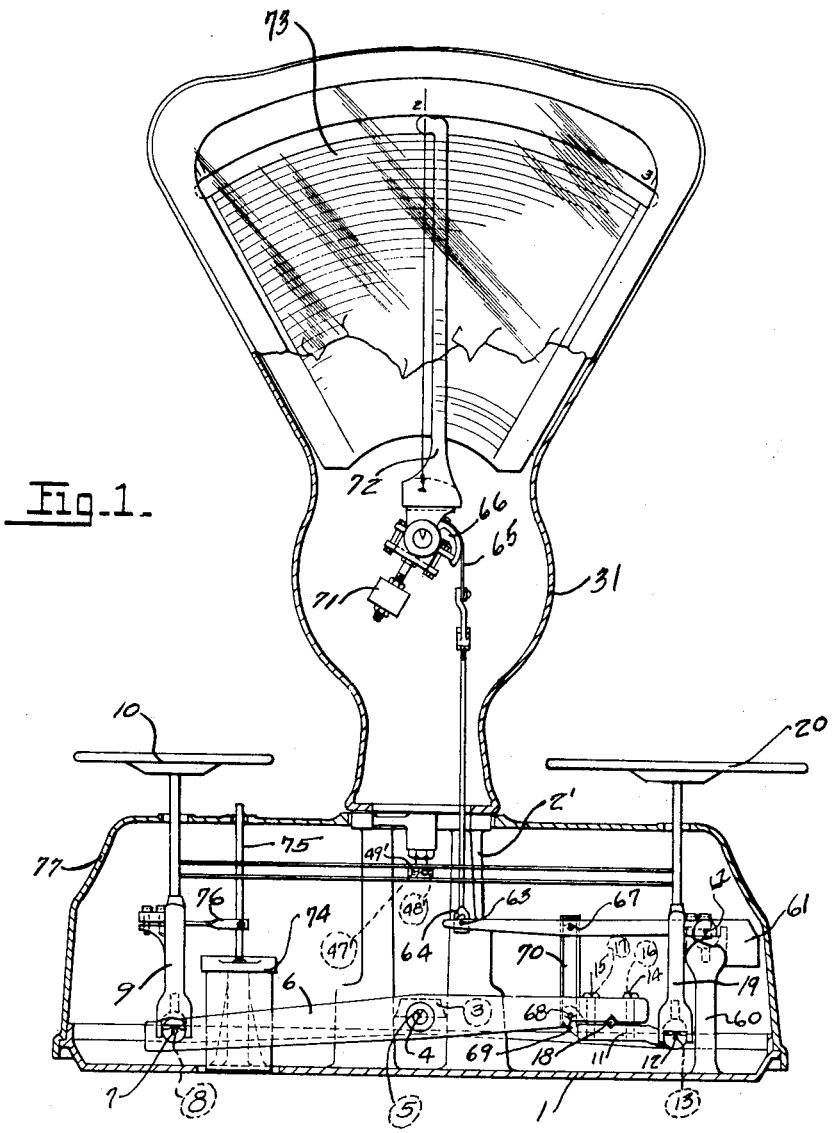

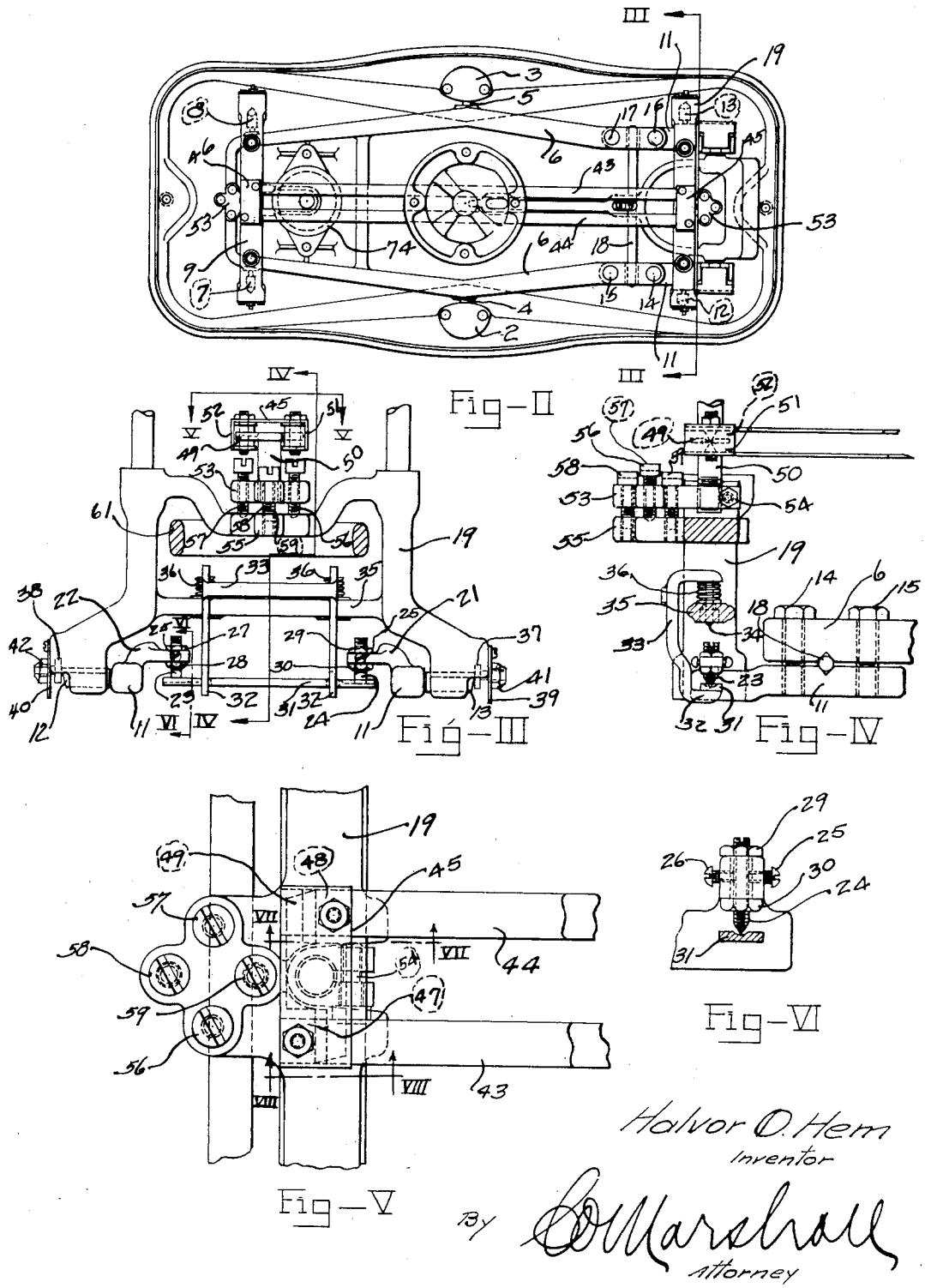

Patented Apr. 10, 1934

1,954,205

UNITED STATES PATENT OFFICE 1,954,205

WEIGHING SCALE

Halvor O. Hem, Toledo, Ohio, assignor to Toledo Scale Manufacturing Company, Toledo, Ohio, a corporation of New Jersey Application October 17, 1929, Serial No. 400,242

2 Claims. (Cl. 265—36)

This invention relates to weighing scales, and more particularly to weighing scales for use in retail shops, and is an improvement which is applicable especially to scales of the type having poise and commodity receivers located at opposite ends of an equal arm lever, the commodity receiver supporting mechanism being connected to an automatic counter balance.

One of the principal objects of the invention is the provision of improved adjustable means for supporting the commodity platform, retaining it in place upon its support and maintaining its condition of level.

Another object of the invention is the provision of improved retaining means for holding commodity receiving platforms and poise receiving platforms in position upon their load pivots.

Another object is the provision of improved means for adjusting the position of such retaining means and load pivots for the purpose of correcting the "range" of the lever pivots.

Another object of the invention is the provision of improved adjustable means for maintaining commodity and poise receiving platforms in the same condition of level throughout weighing movements of the mechanism.

Another object is to provide a compact, reliable and adjustable scale of the type referred to having improved means for adjusting its pivots and bearings to bring them with exactness into proper relation and thereby insure accurate results in the use of the scale.

Other objects and advantages will be apparent from the following description in which reference is had to the accompanying drawings illustrating a preferred embodiment of the invention and wherein similar reference numerals designate similar parts throughout the several views.

In the drawings:—

Figure I is a front elevational view with parts broken away and parts in section showing the assembled mechanism of a scale embodying the invention.

Figure II is a plan view showing the base and platform lever mechanism of the scale, parts being broken away.

Figure III is a side elevational view with parts broken away and parts in section showing the platform supporting mechanism embodying some of the features of the invention.

Figure IV is a fragmentary sectional elevational view taken substantially along the line IV—IV of Figure III.

Figure V is an enlarged fragmentary plan view of the check adjusting mechanism.

Figure VI is an enlarged fragmentary view taken substantially along the line VI—VI of Figure III.

Figure VII is an enlarged fragmentary view taken on the line VII—VII of Figure V showing parts of push members and a bearing block with knife edged plate, which engages the block, shown in section.

Figure VIII is a similarly enlarged fragmentary view taken on the line VIII—VIII of Figure V showing pull members and a bearing block with a knife edged plate engaging the bearing block.

Referring to the drawings in detail, the base 1 of the scale is preferably in the form of a casting, integral with which are fulcrum stands 2 and 3 upon which is mounted by means of knife edged pivots 4 and 5 a lever 6. The lever 6 is of skeleton form and is provided adjacent to one of its ends with a pair of upwardly turned knife pivots 7 and 8 which are adapted to receive a spider 9 which carries a poise receiving platform 10. The other end of the lever 6 consists of a member 11 which carries load pivots 12 and 13. The member 11 is connected at the main body of the lever 6 by means of cap screws 14 and 15, 16 and 17 which pass loosely through openings in the main body of the lever and are threaded in the member 11 and lying between the main body of the lever 6 and the member 11 is a pin 18 upon which the member 11 is rocked when the cap screw on one side of the pin 18 is tightened and the cap screws on the other side of the pin are loosened. This rocking of the member 11 raises and lowers the pivots 12 and 13. The range of the load and fulcrum pivots of the lever 6 may thus be adjusted. Mounted on these pivots 12 and 13 is a spider 19 which carries a load receiver 20. To prevent the spider 19 from being tipped or otherwise displaced from the pivots 12 and 13 when a load is directly on the edge or overhanging the edge of the platform 20, the member 11 has inwardly extending projections 21 and 22 which are provided with apertures through which chisel-like pivots 23 and 24 project. The apertures in the projections 21 and 22 are slightly larger than the body of the chisel-like pivots.

Screws 25 and 26 are threaded through the side walls surrounding these apertures and are adapted to adjust the chisel-like pivots so that their edges are coincident with the pivot line of the pivots 12 and 13. Nuts 27 and 28, 29 and 30 are threaded on the body portion of the chisel-like pivots 23 and 24 above and below the extensions 21 and 22. These nuts, by loosening the top, tightening the bottom or vice versa, permit the edges of the pivots 23 and 24 to be brought to the range line where these pivots, by means of the nuts previously mentioned, are securely locked.

A trough-shaped bar 31 is supported on an arm 32 which is a part of a frame 33. The frame 33 is also provided with projections 34 which loosely fit into apertures in a bar 35 which is an integral part of the spider 19. Surrounding the downward projections 34, resting on the cross bar 35 and urging the frame upwardly are the springs 36. These springs 36 are adapted to hold the trough-shaped bar 31 constantly in engagement with the edges of the pivots 23 and 24. Spring urged spider retaining means have previously been known. The support consisted however, instead, of a frame work 33 of separate rods or pins. It was found in practice that these pins did not support the bar 31 sufficiently, allowing it to slip in a lateral direction, these means had a wearing action on the knife edges, dulling these quickly and changing the range of the pivots. The previous means were also hard to assemble and to properly adjust. It has been found that the means described in this application are a great improvement as they keep the trough-shaped bar 31 in a rigid position, preventing wear and facilitating the assembling of the scale. It also will be seen that the means provided, securely and efficiently prevent any displacement of the bearings on the pivots. To prevent any sliding of the spider in the direction parallel to the pivot edge, the thrust 37 and 38 are provided with threaded stems which are screwed into the plates 39 and 40 secured to the spider, and locked in position by the nuts 41 and 42.

The condition of level of the platforms 10 and 20 is maintained by means of check links located above the lever 6 and extending parallel thereto. The links consist of a pair of pull members 43 to prevent the platform from tilting away from the center of the scale and a pair of push members 44 to prevent the platforms from tilting toward the center of the scale. The pull members 43 and the push members 44 are loosely connected together by means of plates 45 and 46 which serve to keep them from spreading away from each other. A bearing block 47 is pivotally mounted between the pull members 43 at each end, while an oppositely turned bearing block 48 is similarly mounted between the push members 44 at each end. The bearing blocks 47 and 48 engage oppositely turned knife edges formed upon plates 49 which are secured to the upper end of threaded studs 50, each of which forms a part of one of the platform structures. A plate 49', similar to the plate 49, secured to a stationary part of the base 1 and located directly above the axis of the fulcrum pivots 4 and 5, has knife edges which engage oppositely turned bearing blocks 47' and 48' pivoted at the centers of the push and pull members 43 and 44 about which the check links may rock to remain parallel with the lever 6 as it rocks about its fulcrum 4. The spiders 9 and 19 are thus held upright and the condition of level of the platforms 10 and 20 is maintained during rocking movements of the lever 6.

Each stud 50 is threaded into an aperture in a plate 53 and is clamped therein by a screw 54 (see Figures IV and V). The plate 53 is rockably mounted upon a horizontal extension 55 of the spider 19 by screws 56 and 57 which are threaded through the plate 53 and whose lower ends rest on the extension 55, and is secured to the extension 55 by screws 58 and 59 which extend through apertures in the plate 53 and are threaded into the extension 55. By loosening the screw 58 and tightening the screw 59 the plate 53 with the pivot post 50 may be rocked toward and away from the center of the scale to change the position of the pivot edges formed on the plate 49. By adjusting the screws 56 and 57 the plate may be rocked from side to side. The pivot edges may be adjusted about a vertical axis by turning the stud 50 and the height of the pivot edges may be changed by loosening the screws 58 and 59 and tightening the screws 56 and 57, or vice versa. In fact any adjustment of the knife edges on the plate 49 may be made that is necessary to obtain parallelism of the knife edges on the plates 49 at both ends and at the center of the check links and parallelism with the knife edges of the load pivots 7 and 8, 12, 13 and 14 on the lever 6.

Adjacent one end of the base is an upstanding fulcrum stand 60 which carries in its upper end, suitable agate bearings in which a motion multiplying lever 61 is fulcrumed on the pivot 62. The nose pivot 63 rests in a stirrup 64 which is suspended from a flexible metallic ribbon 65 which is secured to and overlies an eccentric sector 66, which forms a part of the automatic load counterbalancing mechanism. This intermediate counterbalancing mechanism is pivotally mounted in a housing 31 which is secured to an upright stand 2' resting on and forming a part of the base 1. Intermediate between the fulcrum pivot 62 and the nose pivot 63 is a pivot 67. This pivot is connected to a pivot 68 located between two extending arms 69 which form a part of the member 11. By a bearing stirrup 70, the motion of the main lever 6 caused by the application of loads upon the commodity receiver 20 is thus transmitted to the pendulous load counterbalancing mechanism. This automatic load counterbalancing mechanism consists of the previously mentioned sector 66, a pendulum 71 and an indicator 72, which is adapted to cooperate with a chart 73 to indicate the amount of the weight of loads.

Vibratory movements of the mechanism are damped and shocks are absorbed by a dash pot 74 mounted on the base 1, the dash pot plunger stem 75 being connected by a gimbal in a bracket 76 which is secured to the spider 9. Adjustment of the dash pot plunger to compensate for changes of the damping medium may be made by means of the plunger stem 75 which extends upwardly through the cover 77 which encloses the mechanism mounted on the base 1.

The embodiment of my invention herein shown and described is to be regarded as illustrative only, and it is to be understood that the invention is susceptible to variation, modification and change within the spirit and scope of the subjoined claims.

Having described my invention, I claim:

1. In a weighing scale, in combination, a main lever having fulcrum pivots, a member adjustably secured to said main lever having load pivots and vertically extending pivots, a load receiver supporting frame mounted upon said load pivots and freely removable means engaging said supporting frame and said vertically extending pivots, said removable means being spring urged and comprising a rigid frame and a rigidly supported bearing bar.

2. In a weighing scale, in combination, a main lever having fulcrum pivots, a member adjustably secured to said main lever having load pivots and vertically extending pivots, a load receiver supporting frame mounted upon said load pivots and freely removable means engaging said supporting frame and said vertically extending pivots, said removable means being spring urged and comprising a rigid frame and a rigidly supported bearing bar, said vertically extending pivots being adjustable vertically, laterally and rotatably about vertical axes.

HALVOR O. HEM.